April 10, 1945.    E. R. PRICE    2,373,259
TRANSMISSION OPERATING MECHANISM
Filed Dec. 31, 1941    5 Sheets-Sheet 1

INVENTOR
EARL R. PRICE
BY H. O. Clayton
ATTORNEY

April 10, 1945.　　　　　E. R. PRICE　　　　　2,373,259
TRANSMISSION OPERATING MECHANISM
Filed Dec. 31, 1941　　　5 Sheets-Sheet 3

INVENTOR
EARL R. PRICE
BY　H. O. Clayton
ATTORNEY

April 10, 1945.  E. R. PRICE  2,373,259
TRANSMISSION OPERATING MECHANISM
Filed Dec. 31, 1941  5 Sheets-Sheet 4

INVENTOR
EARL R. PRICE
BY
ATTORNEY

April 10, 1945.  E. R. PRICE  2,373,259
TRANSMISSION OPERATING MECHANISM
Filed Dec. 31, 1941  5 Sheets-Sheet 5

INVENTOR
EARL R. PRICE
BY H. A. Clayton
ATTORNEY

Patented Apr. 10, 1945

2,373,259

UNITED STATES PATENT OFFICE 2,373,259

TRANSMISSION OPERATING MECHANISM

Earl R. Price, South Bend, Ind., assignor to Bendix Aviation Corporation, South Bend, Ind., a corporation of Delaware Application December 31, 1941, Serial No. 425,113

10 Claims. (Cl. 74—472)

This invention relates in general to means for operating an automotive change-speed transmission and in particular to power means operable to effect a silent and smooth meshing of the gears in all operations of the transmission and irrespective of the speed of the vehicle.

Yet another object of the invention is to provide a transmission operating power means operable, when the vehicle is in motion, to shift either a three-speeds forward and reverse transmission or a two-speed rear axle transmission or so-called overdrive mechanism from a relatively high gear ratio setting to a lower gear ratio setting, this operation being effected without disengaging the clutch. When the transmission is established in this lower gear ratio setting the R. P. M. of the engine is higher with respect to the R. P. M. of the driving wheels of the vehicle than when the transmission is established in the aforementioned relatively high gear ratio setting.

The most important object of my invention, however, is to provide means for so operating an automotive overdrive or a two-speed rear axle mechanism as to insure a synchronization of the driving and driven gears of said mechanism before the latter is shifted from its high to its low gear ratio setting or vice versa.

Yet another object of the invention is to provide a double-acting transmission operating pressure differential and spring operated motor operable, in cooperation with an operation of the accelerator of the vehicle, to actuate a transmission mechanism of an automotive vehicle, said motor being so controlled by valvular means and by the accelerator as to effect a shift from an overdrive setting of the transmission to an underdrive setting thereof when and only when the speed of the engine is such as to insure a quiet meshing of the gears.

A further object of the invention is to provide, in an automotive vehicle including an accelerator and an internal combustion engine having an intake manifold, a transmission operating mechanism including a manifold vacuum and spring operated valve operable when the engine driven driving element of a change gear transmission is rotating at a substantially lower speed than a vehicle driven element of said transmission, to make possible an operation of said mechanism to establish the transmission in gear when and only when the manifold vacuum is decreased by opening the throttle to increase the speed of the engine and thereby operate said valve and also increase the speed of the engine driven element to an amount equal to or substantially equal to the speed of the vehicle driven element to be meshed therewith.

Yet another object of the invention is to provide a multi-stage transmission operating motor, that is one in which a first-stage of movement of the power element of the motor effects a demeshing of gears of the transmission to neutralize the latter and a second stage of movement of said element effects a meshing of the gears of the transmission to establish the same in a new setting.

A further object of the invention is to provide, in an automotive vehicle including an internal combustion engine having an intake manifold, an accelerator and a two-speed axle which may include a synchronizing mechanism, power means for operating the change-speed mechanism of said axle, the operation of said power means being controlled by a manually operated selector valve and by the operation of the internal combustion engine, the latter being in part controlled by the accelerator.

Yet another object of the invention is to provide, in an automotive vehicle having an internal combustion engine, an accelerator and a change-speed transmission capable of being established in one or the other of two gear ratio settings, a spring and vacuum operated motor operably connected with the transmission, said motor being so controlled by a manually operated selector valve and the accelerator as to effect the higher of the two gear ratio settings of the transmission when the selector valve is moved to a certain position and the accelerator is released to idle the engine and to effect the lower of the two gear ratio settings when the selector valve is moved to a certain position and the accelerator is first released and then depressed.

A further object of the invention is to provide power means, including a spring and an intake manifold vacuum operated motor, for operating a change-speed transmission of an automotive vehicle, which transmission may or may not be equipped with a synchronizer mechanism, the operation of said power means being controlled by the accelerator of the vehicle and by a manually operated selector valve conveniently located within easy reach of the driver of the vehicle.

My invention also contemplates the provision of the aforementioned power means for operating the two-speed rear axle of an automotive vehicle, said vehicle being equipped with a manually or power operated change-speed transmission and clutch means incorporated in the force transmitting means and connecting the engine with the change-speed transmission, said clutch means including either a friction clutch of a fluid clutch or both of said clutches.

Other objects of the invention and desirable details of construction of parts will become apparent from the following detailed description of certain embodiments of the invention, taken in conjunction with the accompanying drawings illustrating said embodiments, in which.

Figure 1:
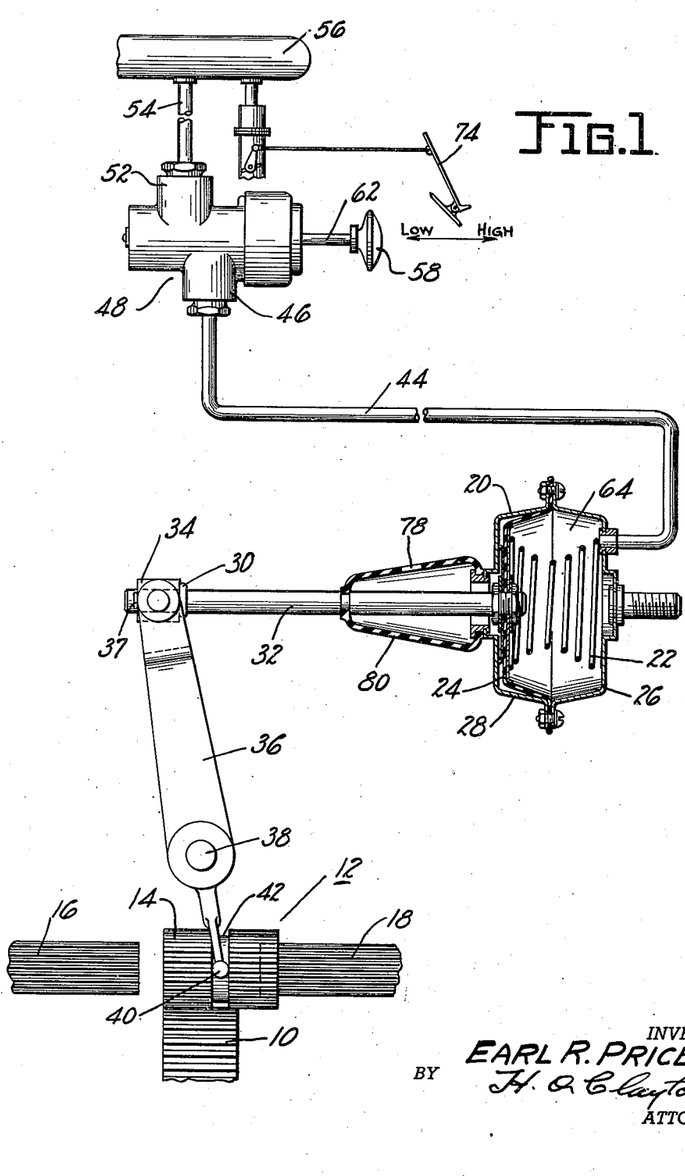
Figure 1 is a diagrammatic view disclosing the transmission operating mechanism of one of the embodiments of my invention coupled to a two-speed rear axle mechanism, said mechanism being established in its low gear setting.

Referring now to Figure 1 diagrammatically disclosing the preferred embodiment of my invention, the propeller shaft driven driving gear member 10 of a two-speed rear axle mechanism 12 is meshed with a laterally movable driving gear 14. The member 14 is internally splined to mesh with either one of two driven gear members 16 and 18 depending on the direction of the movement of the member 14. The gear member 16 constitutes one of a nest of gears, not shown, operative, when the member 14 is meshed with member 16, to establish the two-speed rear axle mechanism in its high gear setting and the member 18 constitutes one of a nest of gears, not shown, operative, when the member 14 is meshed with the member 16, to establish the two-speed rear axle mechanism in its low gear setting. No claim is made to the two-speed rear axle mechanism disclosed in Figure 1 and it is to be noted that this mechanism may be of any conventional design wherein a driving member actuated by the propeller shaft of the vehicle is selectively connected with certain driven parts of the mechanism to establish the transmission mechanism or so-called two-speed rear axle, in one or the other of its gear ratio settings.

It is also within the purview of my invention to provide power means for operating a selective gear transmission including a synchronizer mechanism employing either clutches or blockers, said mechanism cooperating with the accelerator in synchronizing the speeds of the driving and driven elements of the transmission before a meshing of the same is effected.

As will be described hereinafter, the transmission operating power means of my invention cooperates with the operation of the accelerator for the latter in large measure controls the speed of the propeller shaft actuated driving element of the transmission. It is to be clearly understood, however, that the transmission operating power means of my invention may be employed to operate a transmission which is not equipped with a synchronizer mechanism and in the preferred embodiment of my invention disclosed in Figure 1, the transmission does not include a synchronizer.

Continuing now the description of the mechanism disclosed in Figure 1, the driving member 14 of the two-speed axle mechanism is bodily moved laterally to the right or left from one of its gear established positions to the other by means of power means including a single acting pressure differential operated motor 20 and a spring 22, the two together constituting a power unit. This spring is shown housed within the motor 20 between the power element 24 of the motor and an end wall 26 thereof; however, the spring might also be positioned between the end wall 28 of the motor and a stop 30 fixedly secured to the connecting rod 32. This rod 32 is fixedly connected to the power element 24 and, as disclosed in Figure 12, extends through an opening 33 in a block 34 which is pinned to a yoke 35 at the end of a two-armed lever member 36. A pin 37 and the stop 30 both secured to the rod 32 prevent the latter from slipping through the block 34. The lever 36 is fulcrumed on a pin 38 fixedly secured to the two-speed axle casing or some other convenient mounting. The lower arm of the lever 36 is preferably U-shaped and is provided with pins 40 fitting within a groove 42 in the rotatable driving gear member 14. To the end wall 26 of the motor 20 there is connected an air transmitting conduit 44 which is connected at one of its ends to a port 46 of a manually operated three-way selector valve 48 disclosed in detail in Figure 10. This selector valve is preferably mounted upon the instrument board in the driver's compartment and accordingly is within easy reach of the driver. Casing 50 of this valve is provided with a port 52 to which is connected an air transmitting conduit 54 connected at its other end to the intake manifold 56 of the internal combustion engine of the vehicle.

Describing now the operation of the transmission operating mechanism disclosed in Figure 1, and incidentally completing the description of the details thereof, when the vehicle is to be started the engine is of course cranked and with the engine idling the intake manifold is then partially evacuated. It is to be understood that a vehicle equipped with a two-speed rear axle may also be equipped with a friction clutch and a three-speeds forward and reverse transmission or any other type of change-speed transmission which may be neutralized. Now, if the power plant of the vehicle does include such a transmission it is of course necessary to either neutralize the transmission when the vehicle is brought to a stop or disengage the friction clutch before cranking the engine, for it is to be remembered that when a vehicle equipped with the power operated two-speed rear axle disclosed in Figure 1 is brought to a stop the axle mechanism is then in gear. If the vehicle is equipped with a fluid clutch and a selective gear transmission, then it is not necessary to neutralize such a transmission when the vehicle is brought to a stop.

It is of course preferable to start the vehicle with the two-speed axle established in its low gear setting. Accordingly, a knob 58 which is connected to a valve member 60 by a rod 62 is pushed forwardly to its low gear position and in this position a compartment 64 of the motor 20 is vented to the atmosphere via conduit 44, port 46 of the valve 48, the hollow interior of said valve and vent ports 66 in the valve casing 50. The valve member 60 is secured in its low gear position by means of a spring-pressed ball 68 fitting within a detent 70 in the rod 62. When the valve member 58 is in its high gear position as disclosed in Figure 10 the ball fits within a detent 72 in the rod 62.

When the compartment 64 of the motor 20 is vented to the atmosphere the spring 22 expands to the position disclosed in Figure 1 and this expansion effects a counterclockwise rotation of the lever 36, thereby meshing the gears 14 and 18 to establish the axle mechanism in its low gear setting, all as disclosed in Figure 1.

If the vehicle includes a friction clutch and a conventional selective gear transmission i. e., a manually operable three speeds forward and reverse transmission, the clutch is first disengaged and the transmission is then placed in a relatively low gear setting; and these operations are preferably effected before the above described setting of the two speed axle is effected. The friction clutch is then engaged as the accelerator 74 is depressed and the vehicle moves forwardly. After the desired vehicle speed is reached the driver will probably wish to shift the two-speed rear axle transmission mechanism to its high gear setting and to effect this result the knob 58 is pulled outwardly to its high gear position. The valve member 60 of the three-way selector valve 48 is thus moved to the position disclosed in Figure 10 whereby the compartment 64 of the motor 20 is placed in fluid transmitting connection with the intake manifold 56 via conduit 44, valve port 46, a groove 76 in the valve member 60, valve port 52 and conduit 54. The valve 48 may be placed in its high gear position either before or after the accelerator is released and after its release the intake manifold, as previously described, becomes a source of vacuum. The motor 20 is then energized, the power element 24 being moved to the right, Figure 1, because of the differential of pressures to which it is subjected. The left side of the power element is exposed to the atmosphere via an opening 78 in a flexible boot 80 and the right side to the relatively low gaseous pressure within the compartment 64. In moving to the right, Figure 1, to establish the two-speed axle in high gear the power element first neutralizes the two-speed axle mechanism, that is demeshes the gears 14 and 18 and then when the engine has been sufficiently slowed down to effect a synchronization of the gears 14 and 16, the power element resumes its travel to the right to effect a meshing of the latter gears.

The accelerator, which in large measure controls the engine speed, and the selector valve 48 thus provide control means for effecting a multi-stage movement of the power element in its operation of establishing the two-speed axle in its high gear setting, for it is to be remembered that the gears 14 and 18 cannot be demeshed until the engine torque has been reversed by releasing the accelerator. The accelerator controls not only the torque of the engine but also the source of vacuum for energizing the motor 20. It is also to be noted that if the vehicle is equipped with a friction clutch there is no need to disengage this clutch to effect a high gear setting of the two-speed axle.

Now, should the driver desire to again place the two-speed axle in low gear, which operation would be necessary, for example, if the vehicle is climbing a relatively steep hill, a low gear setting of the valve 48 and an operation of the accelerator will effect this result. The venting of the compartment 64 to the atmosphere and the release of the accelerator to reverse the engine torque initiates a partial expansion of the spring 22 to first neutralize the two-speed axle mechanism, that is demesh the gears 14 and 16 and then when the engine has been sufficiently speeded up by depressing the accelerator the spring 22 continues its expansion to effect a meshing of the gears 14 and 18 to establish the transmission in its low gear setting. The teeth of the gears 16 and 18 and the splines of the gear 14 are preferably so shaped as to make possible a meshing of the gears when and only when they are rotating at the same or substantially the same speed. As with the operation of the spring and motor power means to effect a high gear setting of the two-speed axle the accelerator 74 and the selector valve 48 constitute the controls for effecting a multi-stage low gear operation of said power means; for the accelerator, to effect the low gear operation, must first be released to reverse the engine torque and then depressed to speed up the engine and the valve 48 must of course be placed in its low gear position.

It should also again be noted at this juncture that if the vehicle is equipped with a friction clutch there is no need to disengage said clutch to make possible the above described power operations of the two-speed axle mechanism, for as described above, the control of the speed of the driving member 14 under the indirect control of the accelerator makes an operation of the friction clutch unnecessary after the vehicle is in motion.

Figures 2, 12:
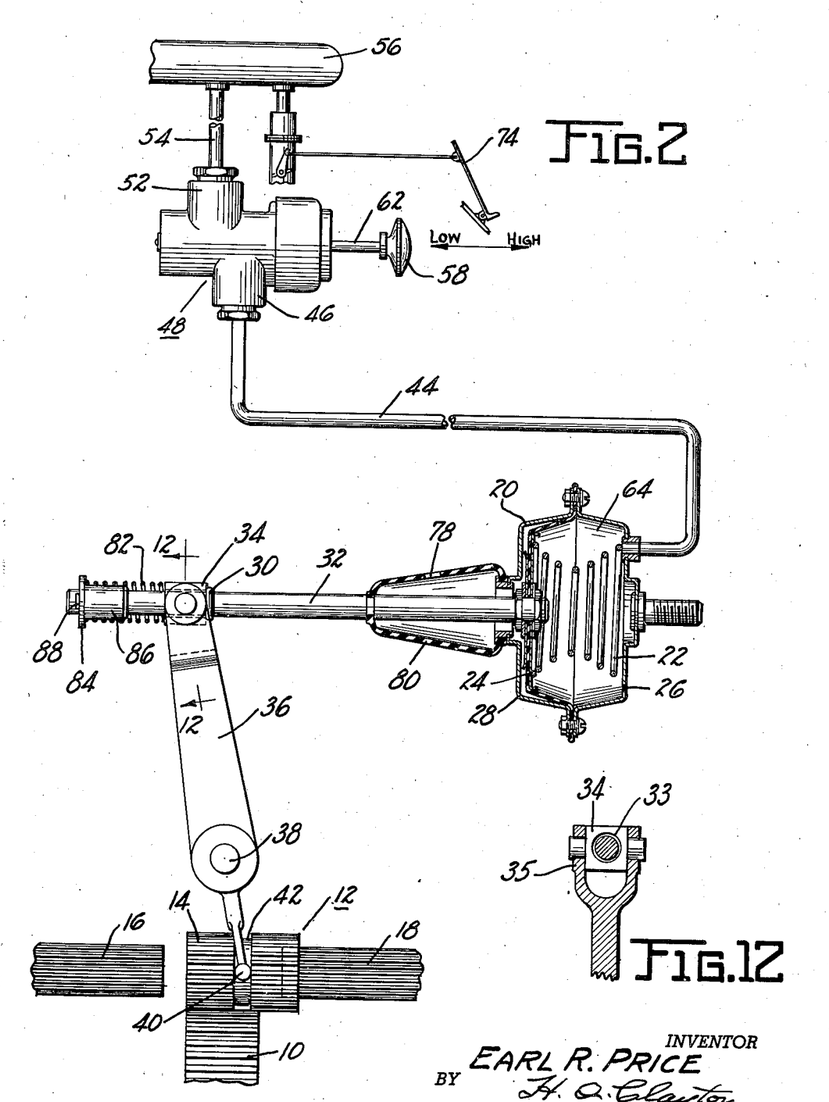
Figure 2 is a diagrammatic view similar to Figure 1 disclosing another embodiment of my invention.
Figure 12 is a sectional view, taken on the line 12—12 of Figure 2, disclosing the connection between the connecting rod of the vacuum motor and the transmission operating crank.

Referring now to Figure 2 disclosing another embodiment of my invention, this mechanism duplicates that of the mechanism of Figure 1 with the exception of the connection between the rod 32 and the lever 36. Describing this connection a spring 82 is interposed between the block 34 and a flange 84 on a sleeve 86 slidably mounted on the rod 32. A pin 88 extending through the rod 32 maintains the sleeve 86 in position on said rod. Describing now the operation of the mechanism of Figure 2 to establish the high gear setting of the two speed axle mechanism, the three way valve 48 is first placed in its high gear setting and the accelerator is then released to reverse the engine torque. Immediately thereafter the vacuum energized motor 20 is operative to establish the two-speed axle in its high gear setting, the power element 24 of the motor completing its full stroke of movement without interruption. During this movement the spring 82, the weight of which is equal to or about one-half the pull of the power element 24, remains solid or substantially solid until the gears 14 and 18 have been demeshed and the gear 14 contacts the gear 16. The completion of the stroke of the power element 24 is effected very quickly and before the gears 14 and 16 have been synchronized; accordingly, the completion of the compression of spring 82 is effected while this synchronizing operation is taking place. Then, immediately after the gears 14 and 16 reach synchronous speeds, that is the same or substantially the same speed, the spring 82 expands, thereby rotating the lever clockwise and meshing the gears 14 and 16 to establish the axle mechanism in its high gear setting. There is thus provided means for in large measure eliminating a clashing of gears when shifting the two-speed axle from its low gear to its high gear setting, for the collapsing of the spring 82 when the gear members 14 and 16 contact with one another serves to cushion the engagement of said members.

As to the operation of the mechanism of Figure 2 in establishing the two speed axle mechanism in its low gear setting this operation is the same as that of the mechanism disclosed in Figure 1 and which operation has been described above.

Figure 11:
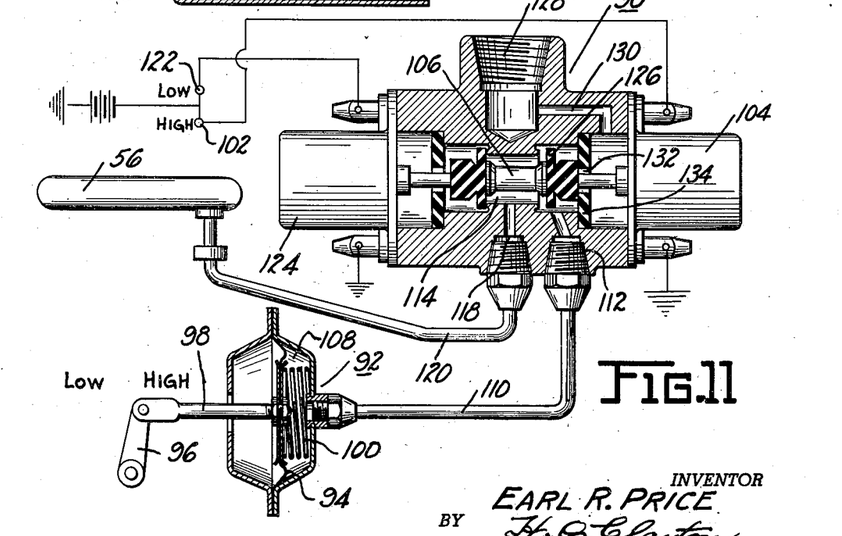
Figure 11 is a diagrammatic view disclosing another embodiment of my invention wherein the selector valve is electrically operated.

There is disclosed in Figure 11 another embodiment of my invention wherein an electrically operated three-way selector valve 90 is used to in part control the operation of a two-speed rear axle operating power means. As with the previously described mechanism disclosed in Figure 1 the power means includes a single acting manifold vacuum operated motor 92 including a power element 94 connected to a crank 96 by a connecting rod 98, said crank when rotated serving to operate the transmission mechanism of the two-speed rear axle; and as with the previously described mechanisms disclosed in Figures 1 and 2 a spring 100 also constitutes a part of the transmission operating power means, said spring serving when expanding to establish the transmission in its low gear setting.

Describing the operation of the mechanism disclosed in Figure 11 and incidentally describing the details of the electrically operated three-way selector valve when the driver of the vehicle desires to establish the two-speed rear axle transmission in high gear he depresses a spring returned button 102, thereby closing a switch to complete an electrical circuit including a solenoid 104. The energization of the solenoid 104 effects the movement of a valve member 106 to the position disclosed in Figure 11 whereby a chamber 108 in the vacuum motor 92 is placed in air transmitting connection with the intake manifold 56 via a conduit 110, a valve port 112, the interior 114 of the valve, a valve port 118 and a conduit 120. The motor 92 is thus energized to establish the transmission in its high gear setting, this operation being effected after the gears to be meshed are synchronized, all as previously described.

When the driver desires to establish the transmission in its low gear setting he depresses a spring returned button 122 thereby closing a switch to effect an energization of a solenoid 124. This operation effects a movement of the valve member 106 to the left, Figure 11, whereby a valve member 126 is seated to cut off the communication between the intake manifold and the motor chamber 108 and vent said chamber to the atmosphere via a valve port 128, a duct 130 in the casing of the valve, an opening 132 in a fitting 134, the aforementioned valve port 112 and the aforementioned duct 110. The venting of the motor chamber 108 to the atmosphere effects a deenergization of the motor thereby making possible an expansion of the spring 100 to establish the transmission mechanism in its low gear setting, all as previously described. Here again the gears to be meshed must be synchronized before the meshing operation may be effected.

There is thus provided a selector valve which may be remotely controlled, for the selector switch buttons 102 and 122 may be conveniently positioned very close to the driving wheel of the vehicle and the selector valve unit 90 may be conveniently mounted either on or near the motor 92.

Figure 10:
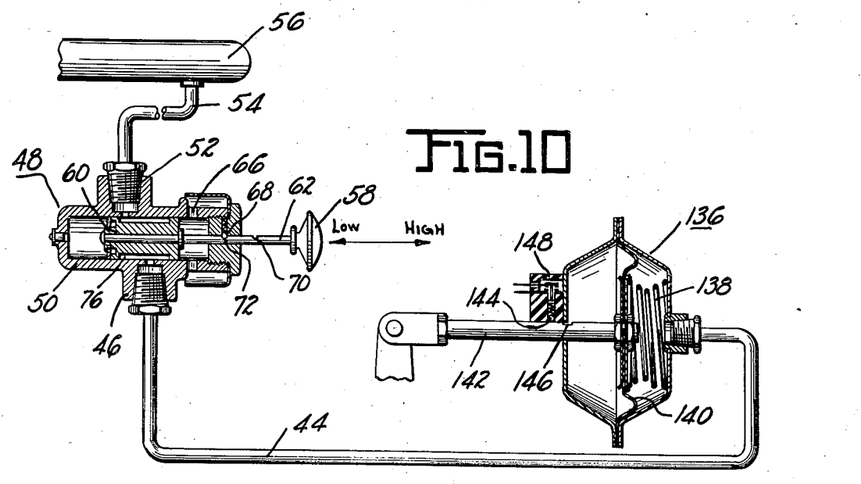
Figure 10 is a diagrammatic view disclosing another embodiment of my invention including part of means for momentarily disabling the ignition system of the internal combustion engine to facilitate the operation of the transmission.

The embodiment of my invention disclosed in Figure 10 duplicates the previously described embodiment disclosed in Figure 1 with the exception that means are provided making it unnecessary to release the accelerator to effect a neutralization of the two-speed rear axle transmission mechanism preliminary to establishing the same in low gear, for with the mechanism disclosed in Figure 10, when the driver wishes to shift the rear axle from high to low gear he merely has to move the valve operating knob 58 to its low gear position whereupon a motor 136 is deenergized resulting in the expansion of a spring 138. The first increment of movement of the power element 140 of the motor results in the taking up of the slack in the connections between said power element and the transmission; accordingly, the then loaded gears 14 and 16 and other gears of the transmission mechanism establishing the same in high gear do not prevent this slack take-up movement of the power element and a connecting rod 142 secured thereto. Now, just as this slack take-up operation is being completed or immediately before its completion a spring-pressed ball 144 is moved into a detent 146 in the then moving rod 142 and this operation makes possible a closing of a so-called interrupter switch 148. This switch is so wired to the ignition system of the internal combustion engine as to effect a disabling of said system when the switch is closed. Continued movement of the rod 142 to the left under the action of the expanding spring 138 results in a relative movement between the base of the detent 146 and the ball 144. Until the detent passes beyond the ball the switch 148 remains closed. Now, during the time that the ignition system is disabled the torque of the engine is of course reversed, that is the engine is not at this time acting as a prime mover or means for driving the gear member 14, and when the engine torque is reversed the spring 138 readily functions to demesh the gear members 14 and 16 and move the member 14 to its transmission neutral position. The parts of the mechanism are so constructed and arranged as to effect a disabling of the ignition system only long enough to make possible a demeshing operation of the transmission and a synchronization of the gears to be meshed which will establish the transmission in low gear.

Continued expansion of the spring 138 results in a movement of the detent 146 out from under the ball 144 thereby effecting a re-opening of the switch 148 with the resultant resumption of the operation of the internal combustion engine. Now, it will be remembered that at this time the gear member 14 is either meshed with the gear member 16 or is just ready to be meshed therewith. The driver then further depresses the accelerator which is at the time partially depressed, whereby the engine is speeded up to increase the speed of the driving gear member 14.

There is thus provided a very simple means for controlling the down-shift, that is the low gear shifting operation of the two-speed rear axle, for with the vehicle travelling in the high gear setting of the two speed axle the driver need only push the knob 58 forwardly, that is toward the instrument panel, and then very shortly thereafter simply further depress the accelerator. It is also within the purview of my invention to employ the power means of Figure 10 as a means for operating the selective gear transmission constituting a part of the power plant of all automotive vehicles. In other words the connecting rod 142 of this figure may be connected to a shift rail operating crank extending from the transmission casing. It is also to be understood that the parts of the mechanism of Figure 10 may be so constructed and arranged as to effect a disabling of the ignition system immediately after the spring 138 begins to expand; in other words, there is no slack take-up movement or at most a negligible amount of slack take-up movement of the rod 142 before the switch 148 is closed.

Figure 3:
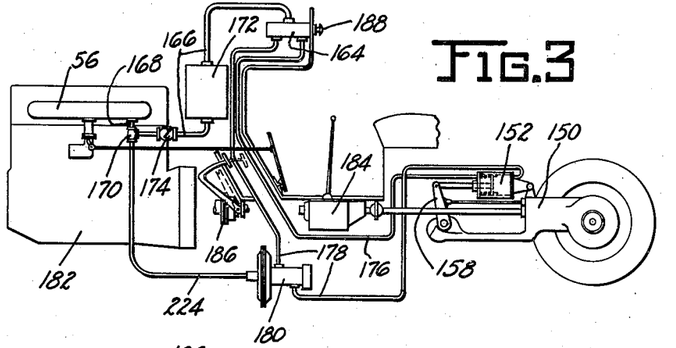
Figure 3 is a diagrammatic view disclosing the principal elements of another embodiment of my invention wherein the control means includes a manifold vacuum and spring operated synchronizer valve.
Figures 4, 5, 6:
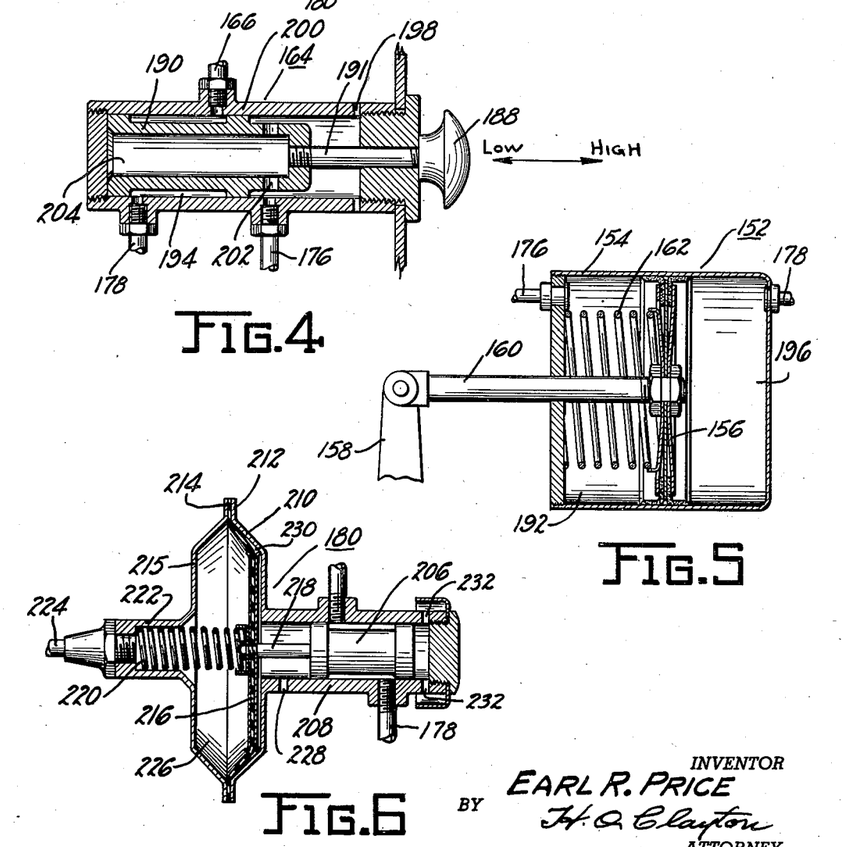
Figure 4 is a sectional view disclosing the details of the manually operated four-way selector valve used with the transmission operating mechanism disclosed in Figure 3.
Figure 5 is a sectional view disclosing in detail the transmission operating pressure differential and spring operated motor of the transmission operating mechanism of Figures 3 and 7.
Figure 6 is a sectional view disclosing in detail the pressure differential and spring operated synchronizer valve of the transmission operating mechanism disclosed in Figures 3 and 7.

There is disclosed in Figure 3 another embodiment of my invention wherein a two-speed axle 150 is operated by a double-acting, double-ended spring and vacuum operated motor unit 152 disclosed in detail in Figure 5. This motor unit comprises a casing 154 housing a power element 156 operably connected to a transmission operating crank 158 by means of a connecting rod 160. A spring 162, interposed between the power element 156 and one end wall of the casing 154, serves, when aided by said power element, to move the transmission from its high gear setting to its neutral setting as a part of the operation of placing the transmission in low gear, all as described in greater detail hereinafter.

The operation of the unit 152 is controlled by a four-way selector valve 164, disclosed in detail in Figure 4, connected to the intake manifold 56 by conduits 166 and 168 which are interconnected by a fitting 170. A vacuum tank 172 and a check valve 174 are incorporated in the conduit 166 for a purpose to be described hereinafter. The selector valve 164 and the motor unit 152 are interconnected by a conduit 176 and a conduit 178, the latter having incorporated therein a spring and manifold vacuum control valve unit 180. Other elements of the automotive power plant disclosed in Figure 3 include the internal combustion engine 182, a standard selective gear transmission 184 and a manually operated friction clutch 186 and these mechanisms cooperate with the two-speed axle operating power means constituting the invention disclosed in said figure. Either one or both of the mechanisms 184 and 186 may be power operated.

Describing now the operation of the mechanism disclosed in Figures 3-6 inclusive and incidentally completing the description of the parts thereof not heretofore referred to, it will be assumed that the vehicle is at a standstill with the engine idling and the two-speed axle in its low gear position. The driver will then, after disengaging the friction clutch 186, probably place the transmission 184 in one of its relatively low gear settings and will then start the vehicle in motion by engaging the friction clutch as the accelerator is depressed to open the throttle.

After the vehicle is under way the driver will then probably wish to establish the two-speed axle in its high gear setting and this is effected by pulling a selector valve operating knob 188 outwardly and releasing the accelerator. The latter operation, as previously described, reverses the torque of the internal combustion engine 182 thereby making it possible for the then energized motor unit 152 to demesh the gears, establishing the two-speed axle in its low gear setting. Describing the operation of the motor unit, when the knob 188 is pulled outwardly, a valve member 190, Figure 4, connected to the knob by a rod 191, is moved to a position to place a compartment 192 of said unit in air transmitting connection with the intake manifold 56 via the conduits 168 and 166, the vacuum tank 172, a recess 194 in the valve member 190 and the conduit 176. This operation of the valve member 190 also vents a compartment 196 of the motor unit to the atmosphere via openings 198 in the casing 200 of the selector valve, openings 202 in the valve member 190, the hollow interior 204 of said valve member, that portion of the conduit 178 interconnecting the valve unit 180 with the compartment 196 and vent ports 232 in said valve unit. A spool-shaped cut-off valve member 206 of the valve unit 180 is at this time, that is when the accelerator is released, in the position disclosed in Figure 6, thereby making possible an air transmitting connection between the conduit 178 and the vent ports 232. The construction and operation of the unit 180 is described in detail hereinafter.

The power element 156 of the motor unit is then subject to a differential of pressures resulting in its moving to the left, Figure 5, to establish the two-speed axle in its high gear setting which operation is completed after the gears to be meshed are synchronized, all as previously described. It will also be noted that in moving to the left the power element 156 serves to compress or cock the transmission neutralizing spring 162.

When the driver wishes to shift the two-speed axle to its low gear setting, e. g. when the vehicle is climbing a hill, the knob 188 is pushed into the position disclosed in Figure 4, whereupon the compartments 196 and 192 of the motor unit are connected respectively to the valve unit 180, Figure 6, and the atmosphere. Now, when the accelerator is released to reverse the torque of the engine the spring 162, constituting a part of the motor unit, expands to the position disclosed in Figure 5, thereby neutralizing the transmission mechanism of the two-speed axle.

Describing now the most important feature of the embodiment of my invention disclosed in Figures 3-6 inclusive, it will be noted, from an examination of the mechanism disclosed in Figure 6, that there is provided the aforementioned spool-shaped cut-off valve member 206 slidable within a valve casing member 208. To one end of the latter member there is secured a disk-shaped member 210 which is secured at its periphery 212 to the periphery 214 of a disk-shaped member 215. The members 210 and 215 together constitute a housing for a flexible diaphragm 216 secured at its periphery to the peripheral portions 212 and 214 of said members and secured at its central portion to one end of a rod 218 extending from one end of the cut-off valve member 206. A spring 220 is interposed between the diaphragm 216 and one end of a hollow member 222 extending from and integrally secured to the member 215. A conduit 224, interconnecting the aforementioned fitting 170 and one end of the hollow member 222, serves to place a compartment 226 of the valve unit 180 in air transmitting communication with the intake manifold.

Describing the operation of the spring and pressure differential operated valve unit 180, when the accelerator is depressed the gaseous pressure within the intake manifold is, as is well known in this art, relatively low; accordingly, the gaseous pressure within the compartment 226 is correspondingly low. The spring 220 then expands to move the diaphragm 216 to the position disclosed in Figure 6 and air to the right of the diaphragm is forced out of the valve unit through an opening 228. The cut-off valve member 206 is by this operation moved to the aforementioned position whereby the two sections of the conduit 178 are placed in air transmitting connection with one another. It is to be remembered that this is the position of the valve member 206 when the knob 188 is pushed inwardly to its low gear position before the accelerator is released; however, it is also to be remembered that despite the fact that the power element 156 of the motor unit 152 is then subjected to a differential of pressures and to the loading of the spring 162, said power element will not move to the right to neutralize the two-speed axle transmission until the accelerator is released to reverse the engine torque.

Continuing the description of the cycle of operations to establish the two-speed axle transmission in low gear, the selector valve 164 having been placed in its low gear position and the accelerator released to effect a neutralization of the axle mechanism, the accelerator is then depressed to increase the speed of the engine to effect a speeding up of the driving gear 14 and a resultant synchronization of the gears of the transmission to be meshed and also effect an expansion of the spring 220 to move the valve member 206 to the position disclosed in Figure 6; for when the accelerator is released the resultant lowering of the gaseous pressure in the intake manifold effects a partial evacuation of the compartment 226 of the valve unit 180. The diaphragm 216 is then subject to a differential of pressures, for a compartment 230 of the unit 180 is at the time vented to the atmosphere via the opening 228 in the valve casing 208. It is apparent, therefore, that when the accelerator is released the diaphragm 216 and the cut-off valve member 206 connected thereto are moved to the left, Figure 6, to cut off the connection between the sections of the conduit 178 and vent the compartment 196 of the motor unit 152 to atmosphere via the openings 232 in the valve casing member 208 and the lower section of said conduit.

It follows, therefore, that after the accelerator is released to effect a neutralization of the two-speed axle the motor unit 152 is not again energized to make possible a low gear operation of the two-speed axle until the accelerator is again depressed sufficiently to effect an operation of the cut-off valve 206 by the spring 220, and it now becomes apparent why the vacuum tank 172 is incorporated in the conduit 166, for despite the presence of the check valve 174 there might, due to the insufficient length of the conduits 166 and 178 or their interior diameters be an inadequate source of vacuum to effect an operation of the motor unit 152.

At this juncture it may be noted that the shift levers 36 or 158 may, in lieu of their connection with the gears disclosed in Figures 1 and 2, be connected to a selector ring which in turn cooperates with so-called high and low range pinions of the transmission mechanism.

Completing the description of the operation of the mechanism disclosed in Figure 3 when the gears 14 and 18 have been synchronized the then loaded power element 156 completes the movement of the shift lever 158 to establish the two-speed axle in its low gear setting.

There is thus provided, in the mechanism disclosed in Figures 3–6 inclusive, what may be termed fool-proof means for effecting a speedy and quiet operation of the transmission mechanism of a standard two-speed axle which axle may or may not include a synchronizer mechanism; for with the mechanism disclosed in these figures, the selector valve 164 may be operated either before or after the accelerator is released and all that the driver need do, to place the two-speed axle in low gear, is to release and then depress the accelerator. To place the two-speed axle in high gear the driver merely operates the valve 164 and releases the accelerator.

Figure 7:
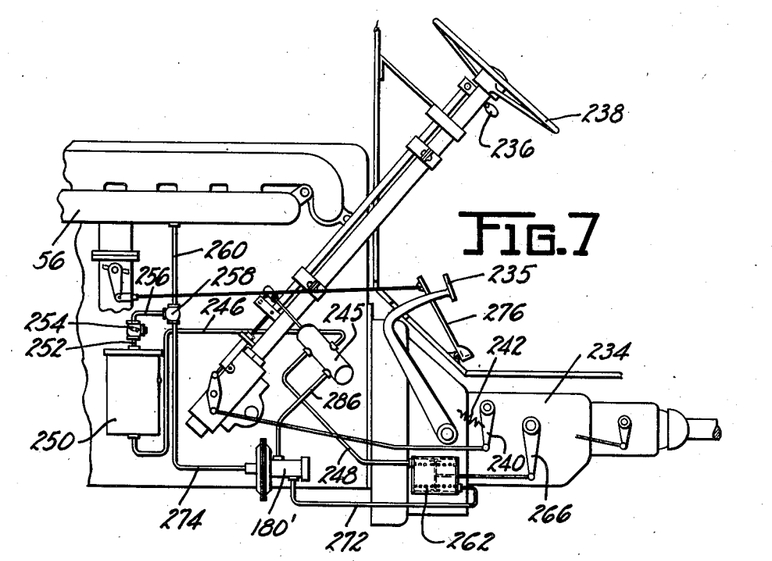
Figure 7 is a view similar to Figure 3 disclosing the transmission operating mechanism of Figure 3 coupled to the shift rail operating crank of a three-speeds forward and reverse transmission.

The embodiment of my invention disclosed in Figure 7 is in general similar to that disclosed in Figures 3–6 inclusive, differing only in a slight change in the construction of the selector valve and in the provision of two transmission neutralizing springs within the transmission operating unit. The embodiment of my invention disclosed in Figures 3–6 inclusive includes but one transmission neutralizing spring.

Describing now both the operation of this mechanism and the details of its construction, it will be assumed that with the vehicle at a standstill and the engine idling the selective three-speeds forward and reverse transmission 234 is in its neutral position as is disclosed in Figure 7. The driver will then probably wish to establish the transmission in low gear whereupon after first moving a clutch pedal 235 to disengage the clutch a selector lever 236 is moved upwardly in a plane perpendicular to the plane of the steering wheel 238, thereby effecting, by the force transmitting linkage disclosed in Figure 7, a counterclockwise rotation of a crank 240. This crank is connected to mechanism within the transmission which serves to select one or the other of the two shift rails to be moved and is biased by a spring 242 to a position to effect a selection of the second and high gear rail.

Figure 8:
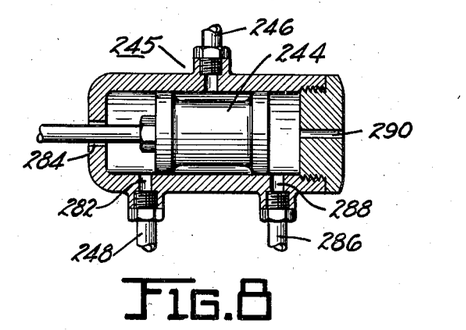
Figure 8 is a sectional view disclosing the details of the manually operated four-way selector valve of the transmission operating mechanism disclosed in Figure 7.

The selector lever 236 having been actuated to effect a selection of the low and reverse gearshift rail, is then rotated clockwise in a plane parallel or substantially parallel to the steering wheel, thereby moving to the left a spool-shaped valve member 244 of a selector valve unit 245, Figure 8, to interconnect conduits 246 and 248. The valve member 244 is connected to the selector lever 236 by any suitable force transmitting linkage which constitutes no part of my invention.

Figure 9:
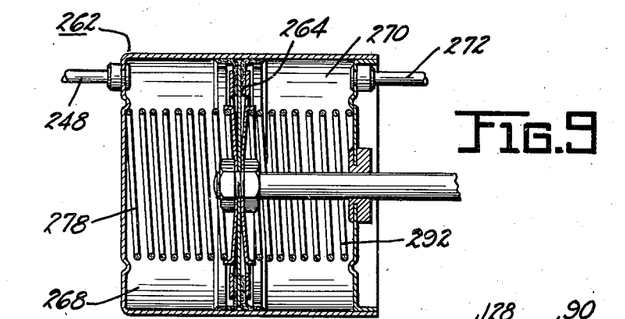
Figure 9 is a sectional view disclosing the pressure differential and spring operated transmission operating motor of the transmission operating mechanism disclosed in Figure 7.

The conduit 246 is connected to the intake manifold 56 by means of a vacuum tank 250, a conduit 252, a check valve 254, a conduit 256, a hollow fitting 258 and a conduit 260; and the conduit 248 is connected to one end of a spring and pressure differential operated transmission member operating motor unit 262 disclosed in detail in Figure 9.

The motor unit 262 is then energized, the power element 264 thereof moving to the left, Figures 7 and 9, to rotate a crank 266 clockwise to establish the transmission in low gear. Describing this energization of the motor unit a compartment 268 of said unit is, as has just been described, connected to the source of vacuum, thereby partially evacuating, that is lowering, the gaseous pressure within said compartment and a compartment 270 of said unit vented to the atmosphere via a conduit 272 and a valve unit 180' which duplicates the above described valve unit 180. The unit 180' is connected to the hollow fitting 258 by means of a conduit 274 said fitting being connected to the intake manifold by the conduit 260. The cut-off valve unit 180' is of course at the time moved to a position to connect the conduit 272 with the atmosphere, for the accelerator is at the time in its released position, thereby making of the intake manifold a source of vacuum to effect a leftward movement of the valve operating diaphragm within the unit 180'.

The transmission 234 having been established in low gear the driver then re-engages the friction clutch and at the same time depresses the accelerator 276 to increase the speed of the engine and get the vehicle under way. When it is desired to establish the transmission in second gear the accelerator is released to reverse the engine torque and after releasing the accelerator the selector lever 236 is then moved in a counterclockwise direction to its transmission neutral position disclosed in Figure 8. In this position both compartments 268 and 270 of the motor unit 262 are vented to the atmosphere. The compartment 268 is vented via the conduit 248, a port 282 in the casing of the valve unit 245 and an opening 284 in the end wall of said casing; and the compartment 270 is vented to the atmosphere via the conduit 272, the valve unit 180', a conduit 286 interconnecting the unit 180' with the valve 245, a port 288 in the casing of the valve 245 and an opening 290 in the end wall of said casing.

Now, when the compartments 268 and 270 are vented to the atmosphere and the engine torque has been reversed by releasing the accelerator a spring 278 within the compartment 268 of the motor unit 262 is free to expand and in so doing effects a counterclockwise rotation of the crank 266 to neutralize the transmission; and this is accomplished without disengaging the friction clutch. The driver then permits the spring 242 to rotate the crank 240 and the selector lever 236 connected thereto to effect the so-called cross shift operation of the transmission, that is effect a selection of the second and high gearshift rail, and the driver then rotates the selector lever in a counterclockwise direction to move the selector valve member 244 to its second gear position, that is to the right in Figure 8. In this position of the valve member 244 the compartment 270 of the motor unit 262 is placed in air transmitting connection with the vacuum tank 250 via conduit 246, valve unit 245, conduit 286, valve unit 180' when in its cut-off position and conduit 272; and the compartment 268 of the motor unit 262 is vented to the atmosphere via conduit 248, port 282 in the valve unit 245 and opening 284 in said valve unit.

It will be remembered, however, that with the accelerator released the cut-off valve member 206 of the valve 180' is in its cut-off position, that is in position to vent the compartment 270 to atmosphere. Accordingly, it is necessary for the driver to then depress the accelerator to effect the cut-in operation of the valve unit 180' and incidentally this operation effects the necessary speeding up of the engine and the driving gears or equivalent mechanism of the transmission connected thereto. The cut-in operation of the valve unit 180' completes the air transmitting connection between the compartment 270 of the motor unit 262 and the vacuum tank 250 whereupon said unit is energized to effect the second gear meshing operation of the then synchronized transmission.

There is thus provided, in the mechanism disclosed in Figures 6-9 inclusive, means for operating a standard three-speeds forward and reverse transmission requiring but a minimum of technique in the operation of the controls; for after the vehicle is under way there is no need to operate the friction clutch and the driver has merely to operate the accelerator 276 and the selector lever 236 in the manner described to effect all operations of the transmission. The operation of the mechanism to effect the reverse and high gear settings of the transmission have not been described inasmuch as these operations are apparent from the foregoing description of the operations to establish the transmission in low and second gear. Suffice it to say that to effect a reverse gear setting of the transmission the selector lever 236 is moved, from its transmission neutral position, to effect the cross shift operation of the transmission in the same manner as was necessary preliminary to placing the transmission in low gear and said lever is then moved in a counterclockwise direction to effect an energization of the motor unit 262; and to neutralize the transmission from either its reverse gear or second gear settings the selector lever is moved to its transmission neutral position, whereupon after the accelerator is released to reverse the engine torque a spring 292 within compartment 270 of the motor unit 262 functions to neutralize the transmission. The springs 278 and 292 of the motor unit 262, Figure 9, and the spring 162 of the motor unit 152, Figure 5, function only to neutralize the transmission when and only when the selector valve is operated, all as previously described.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with an internal combustion engine having an intake manifold and further provided with a two-speed rear axle transmission comprising relatively movable members which are either meshed with each other or demeshed in the operation of the transmission, a crank operably connected to said transmission, power means for rotating said crank to establish said mechanism in one or the other of its gear ratio settings said power means including a spring and pressure differential operated motor unit, spring operated in one direction to rotate said crank to establish the transmission in one of its settings and pressure differential operated to rotate said crank to establish the transmission in the other of its settings, an air transmitting conduit interconnecting the intake manifold of the internal combustion engine with said motor, a three-way motor unit controlling valve mechanism incorporated in said conduit, and means including a spring interconnecting the power element of said motor unit with the transmission for cooperating with the power element of the motor, when the same is operated by a differential of air pressures acting thereon, to effect two stages of movement of said crank in its operation of actuating the transmission to establish one of its settings said two stages of movement being effected by virtue of the collapsing of the latter spring when the aforementioned relatively movable transmission members fail to mesh with each other and the subsequent expansion of said spring when said transmission members move into mesh with each other.

2. In an automotive vehicle provided with an internal combustion engine, an accelerator for in part controlling the operation of said engine and a two-speed rear axle mechanism having driven members and a propeller shaft actuated driving member which may be selectively connected with said driven members, a crank connected to the driving member and power means for moving said crank comprising a single-acting vacuum operated motor having its power element connected to said crank and movable, when the motor is energized, to rotate the crank in a direction to establish the two-speed rear axle in the higher of its two gear ratio settings, a spring which is compressed by the power element of the motor and which is operable when the motor is deenergized, to rotate the crank in a direction to establish the two-speed rear axle in the lower of its two gear ratio settings, means for controlling the operation of said motor and spring including a manually operated three-way selector valve mounted within easy reach of the driver of the vehicle, an air transmitting conduit interconnecting said valve with the intake manifold of the internal combustion engine and another air transmitting conduit interconnecting said valve with the motor, the parts of the aforementioned mechanism being so constructed and arranged and so operative as to effect the high gear setting of the two-speed axle when the selector valve is operated to connect the intake manifold with the motor and the accelerator is released to idle the engine and thereby create sufficient vacuum in the intake manifold to effect an energization of the motor and reverse the torque of the engine to make possible the demeshing of the low speed gears of the transmission and a meshing of the high speed gears after the propeller shaft actuated driving member and one of the driven members of the two-speed axle are synchronized, the mechanism being also operative to effect a low gear setting of the two-speed axle when the accelerator is released to reverse the torque of the engine and the selector valve is operated to cut off the connection between the intake manifold and motor and connect the latter with the atmosphere, thereby deenergizing the motor and permitting the spring to partially expand to demesh the gears establishing the axle mechanism in its high gear setting and to complete its expansion to establish the axle mechanism in its low gear setting when the accelerator is depressed to speed up the engine and thereby effect a synchronization of the propeller shaft operated driving member and one of the driven members of the two-speed axle mechanism.

3. In an automotive vehicle provided with an internal combustion engine, an accelerator for in part controlling the operation of said engine and a two-speed axle mechanism comprising rotatable members to be meshed and demeshed, power means for operating said mechanism comprising a spring and pressure differential operated motor unit, means for connecting the power element of the motor with the two-speed axle mechanism including a crank, a connecting rod and a spring, the latter constituting a yieldable connection between the crank and rod when and only when the rod is moved in one direction by the power element of the motor and the aforementioned rotatable members during this operation temporarily fail to mesh with one another and means for controlling the operation of said motor and springs in cooperation with the operation of the accelerator, said means including a manually operable three-way selector valve mounted within the driver's compartment of the vehicle.

4. In an automotive vehicle provided with an internal combustion engine, a carburetor, including a throttle valve, for in part controlling the operation of the engine and power transmission mechanism interconnecting the engine and driving wheels of the vehicle, said mechanism including a two speed axle mechanism comprising rotatable members to be meshed and demeshed, power means for operating said latter mechanism comprising a motor having a compartment outlined by the power element of the motor and one end thereof, said power element being operably connected to the two speed axle mechanism, a spring housed within said compartment and compressed by the power element of the motor, said spring, when expanding serving to move the power element and the axle mechanism connected thereto to establish said mechanism in one of its two settings, an air transmitting conduit interconnecting said compartment with the intake manifold of the engine and a manually controlled three-way valve interposed in said conduit, said valve when moved to one of its operative positions serving to vent said compartment to the atmosphere and thereby permit the aforementioned expansion of the spring to first uncouple certain members of the two speed axle mechanism and thereby neutralize said mechanism, said operation being effected when and only when the throttle valve is closed to reverse the torque of the internal combustion engine, the expanding spring then serving to couple certain members of the two-speed axle mechanism to establish said mechanism in one of its settings, said latter operation being facilitated by an opening of the throttle valve to speed up the engine and a driving member of the two speed axle mechanism connected thereto, the three-way valve also serving, when moved to a second operative position, to connect the intake manifold of the engine to the motor to thereby make possible a partial evacuation of the aforementioned motor compartment, when, by virtue of a closing of the throttle valve, the internal combustion engine is idling to create a partial vacuum in the intake manifold, whereby the motor is energized to establish the two speed axle mechanism in the other of its two settings.

5. In an automotive vehicle provided with an internal combustion engine, an accelerator for in part controlling the operation of said engine and a two speed rear axle mechanism having driven members and a propeller shaft actuated driving member which may be selectively connected with said driven members, a crank connected to the driving member and power means for moving said crank comprising a single acting vacuum operated motor having its power element connected to said crank by means including a spring, said power element and latter means being operable, when the motor is energized, to rotate the crank in a direction to establish the two speed rear axle in the higher of its two gear ratio settings, said rotation, by virtue of the operation of the spring, being effected in two stages, a spring which is compressed by the power element of the motor and which is operable when the motor is deenergized, to rotate the crank in a direction to establish the two speed rear axle in the lower of its two gear ratio settings, means for controlling the operation of said motor and said second spring including a manually operated three-way selector valve mounted within easy reach of the driver of the vehicle, an air transmitting conduit interconnecting said valve with the intake manifold of the internal combustion engine and another air transmitting conduit interconnecting said valve with the motor, the parts of the aforementioned mechanism being so constructed and arranged and so operative as to effect the high gear setting of the two-speed axle when the selector valve is operated to connect the intake manifold with the motor and the accelerator is released to idle the engine and thereby create sufficient vacuum in the intake manifold to effect an energization of the motor and reverse the torque of the engine to make possible the demeshing of the low speed gears of the transmission and a meshing of the high speed gears after the propeller shaft actuated driving member and one of the driven members of the two-speed axle are synchronized, the mechanism being also operative to effect a low gear setting of the two-speed axle when the accelerator is released to reverse the torque of the engine and the selector valve is operated to cut off the connection between the intake manifold and motor and connect the latter with the atmosphere, thereby deenergizing the motor and permitting the spring to partially expand to demesh the gears establishing the axle mechanism in its high gear setting and to complete its expansion to establish the axle mechanism in its low gear setting when the accelerator is depressed to speed up the engine and thereby effect a synchronization of the propeller shaft operated driving member and one of the driven members of the two-speed axle mechanism.

6. In an automotive vehicle provided with an internal combustion engine, a carburetor, including a throttle valve, for in part controlling the operation of the engine and power transmission mechanism interconnecting the engine and driving wheels of the vehicle, said mechanism including a change speed transmission mechanism comprising rotatable members to be meshed and demeshed, power means for operating said latter mechanism comprising a motor having a compartment outlined by the power element of the motor and one end thereof, said power element being operably connected to the change speed transmission mechanism, a spring housed within said compartment and compressed by the power element of the motor, said spring, when expanding serving to move the power element and the transmission mechanism connected thereto to establish said mechanism in one of its settings, an air transmitting conduit interconnecting said compartment with the intake manifold of the engine and a manually controlled three-way valve interposed in said conduit, said valve when moved to one of its operative positions serving to vent said compartment to the atmosphere and thereby permit the aforementioned expansion of the spring to first uncouple certain members of the change speed transmission mechanism and thereby neutralize said mechanism, said operation being effected when and only when the throttle valve is closed to reverse the torque of the internal combustion engine, the expanding spring then serving to couple certain members of the change speed transmission mechanism to establish said mechanism in one of its settings, said latter operation being facilitated by an opening of the throttle valve to speed up the engine and a driving member of the change speed transmission mechanism connected thereto, the three-way valve also serving, when moved to a second operative position, to connect the intake manifold of the engine to the motor to thereby make possible a partial evacuation of the aforementioned motor compartment, when, by virtue of a closing of the throttle valve, the internal combustion engine is idling to create a partial vacuum in the intake manifold, whereby the motor is energized to establish the change speed transmission mechanism in another of its settings.

7. In an automotive vehicle provided with an internal combustion engine having an intake manifold, an accelerator for in part controlling the operation of said engine and a two speed rear axle mechanism having driven members and a propeller shaft actuated driving member which may be selectively connected with said driven members, a crank connected to the driving member and power means for moving said crank comprising a motor, the power element of which is operably connected to said crank and serves to move the same in one or the other of two directions to establish the axle mechanism in either one or the other of its two settings, means interconnecting said power element with said crank including a spring said power element and spring being operable, when the motor is energized, to rotate the crank to establish the two speed rear axle in one of its two gear ratio settings, said rotation, by virtue of the operation of the spring, being effected in two stages, means for controlling the operation of said motor including a manually controlled selector valve, air transmitting means interconnecting said valve with the intake manifold and other air transmitting means interconnecting said valve with the motor, the parts of the aforementioned mechanism being so constructed and arranged and so operative as to effect the aforementioned setting of the two speed axle when the selector valve is operated to connect the intake manifold with the motor and the accelerator is released to idle the engine and thereby create sufficient vacuum in the intake manifold to effect an energization of the motor, said release of the accelerator also serving to reverse the torque of the engine to make possible a gear demeshing operation of the two speed axle mechanism and a gear meshing operation of said mechanism after the propeller shaft actuated driving member and one of the driven members of said mechanism are synchronized, the power means being also operative to effect the other setting of the axle mechanism when the accelerator is released to reverse the torque of the engine and the selector valve is again operated to effect another operation of the motor the gear establishing operation of the axle mechanism being effected after the accelerator is depressed to effect a speeding up of the engine and a resultant synchronization of the driving and driven members of the axle mechanism.

8. In an automotive vehicle provided with an internal combustion engine, an accelerator for in part controlling the operation of said engine, and a two-speed rear axle mechanism including low gear and high gear engageable means, a crank connected to effect changes in gear ratios in said axle mechanism, power means for moving said crank comprising a single-acting vacuum operated motor having its power element connected to said crank and movable, when the motor is energized, to rotate the crank in a direction to establish the two-speed rear axle in the higher of its two gear ratio settings, a spring which is compressed by the power element of the motor and which is operable when the motor is deenergized, to rotate the crank in a direction to establish the two speed rear axle in the lower of its two gear ratio settings, means for controlling the operation of said motor and spring including a manually operated three-way selector valve mounted within easy reach of the driver of the vehicle, an air transmitting conduit interconnecting said valve with the intake manifold of the internal combustion engine and another air transmitting conduit interconnecting said valve with the motor, the parts of the aforementioned mechanism being so constructed and arranged and so operative as to effect the high gear setting of the two-speed axle when the selector valve is operated to connect the intake manifold with the motor and the accelerator is released to idle the engine and thereby create sufficient vacuum in the intake manifold to effect an energization of the motor and reverse the torque of the engine to make possible the disengagement of the low speed gear ratio of the axle mechanism and engagement of the high speed gear ratio when the high gear engageable means are synchronized, the mechanism being also operative to effect a low gear setting of the two-speed axle when the accelerator is released to reverse the torque of the engine and the selector valve is operated to cut off the connection between the intake manifold and motor and connect the latter with the atmosphere, thereby deenergizing the motor and permitting the spring to partially expand to discharge the axle mechanism in its high gear setting and to complete its expansion to establish the axle mechanism in its low gear setting when the accelerator is depressed to speed up the engine and thereby effect a synchronization of the low gear engageable means of the two-speed axle mechanism.

9. In a system for the operation of a shiftable axle gear mechanism in an automotive vehicle, including an internal combustion engine having ignition means, a throttle, an intake manifold, a manually operated valve connected with said intake manifold, a fluid motor connected with said valve and controlled by said valve, manually operated means for actuating said valve to selectively establish communication between said intake manifold and said fluid motor or to vent said fluid motor to the atmosphere, a shiftable axle gear mechanism, said fluid motor including spring-loaded means connected with said shiftable axle gear mechanism, said fluid motor being operable when in communication with said intake manifold to shift said axle gear mechanism to one gear ratio from another and said spring-loaded means yieldably opposing said shifting and tending to maintain said axle gear mechanism in said other gear ratio; and means, including switch means, for rendering said ignition means ineffective to thereby release the engine torque on said axle mechanism and thus facilitate the operation of said fluid motor in the shifting of said axle gear mechanism into one of its settings.

10. In a system for the operation of a shiftable axle gear mechanism in an automotive vehicle, including an internal combustion engine having ignition means, a throttle, an intake manifold, a manually operated valve connected with said intake manifold, a fluid motor connected with said valve and controlled by said valve, manually operated means for actuating said valve to selectively establish communication between said intake manifold and said fluid motor or to vent said fluid motor to the atmosphere, a shiftable axle gear mechanism, said fluid motor including spring-loaded means connected with said shiftable axle gear mechanism, said fluid motor being operable when in communication with said intake manifold to shift said axle gear mechanism to one gear ratio from another and said spring-loaded means yieldably opposing said shifting and tending to maintain said axle gear mechanism in said other gear ratio; and means, including switch means actuable by said spring-loaded means, for rendering said ignition means ineffective to thereby release the engine torque on said axle mechanism and thus facilitate the operation of said fluid motor in the shifting of said axle gear mechanism into one of its settings.

EARL R. PRICE.

CERTIFICATE OF CORRECTION.

Patent No. 2,373,259.  April 10, 1945.

EARL R. PRICE.

It is hereby certified that error appears in the printed specification of the above numbered patent requiring correction as follows: Page 10, first column, line 60, claim 8, for the word "discharge" read --disengage--; and that the said Letters Patent should be read with this correction therein that the same may conform to the record of the case in the Patent Office.

Signed and sealed this 29th day of January, A. D. 1946.

Leslie Frazer (Seal)  First Assistant Commissioner of Patents.